Patented May 7, 1935

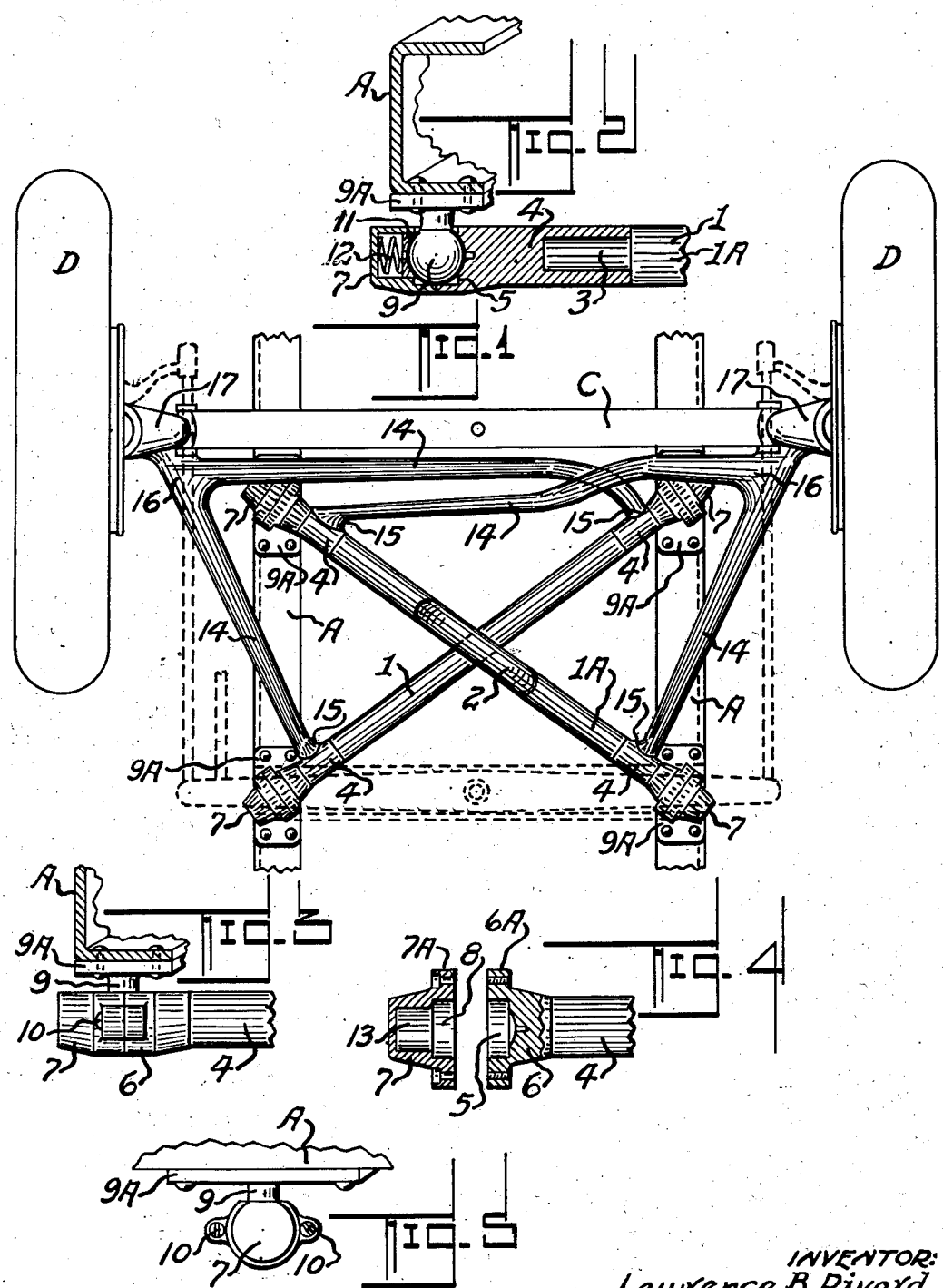

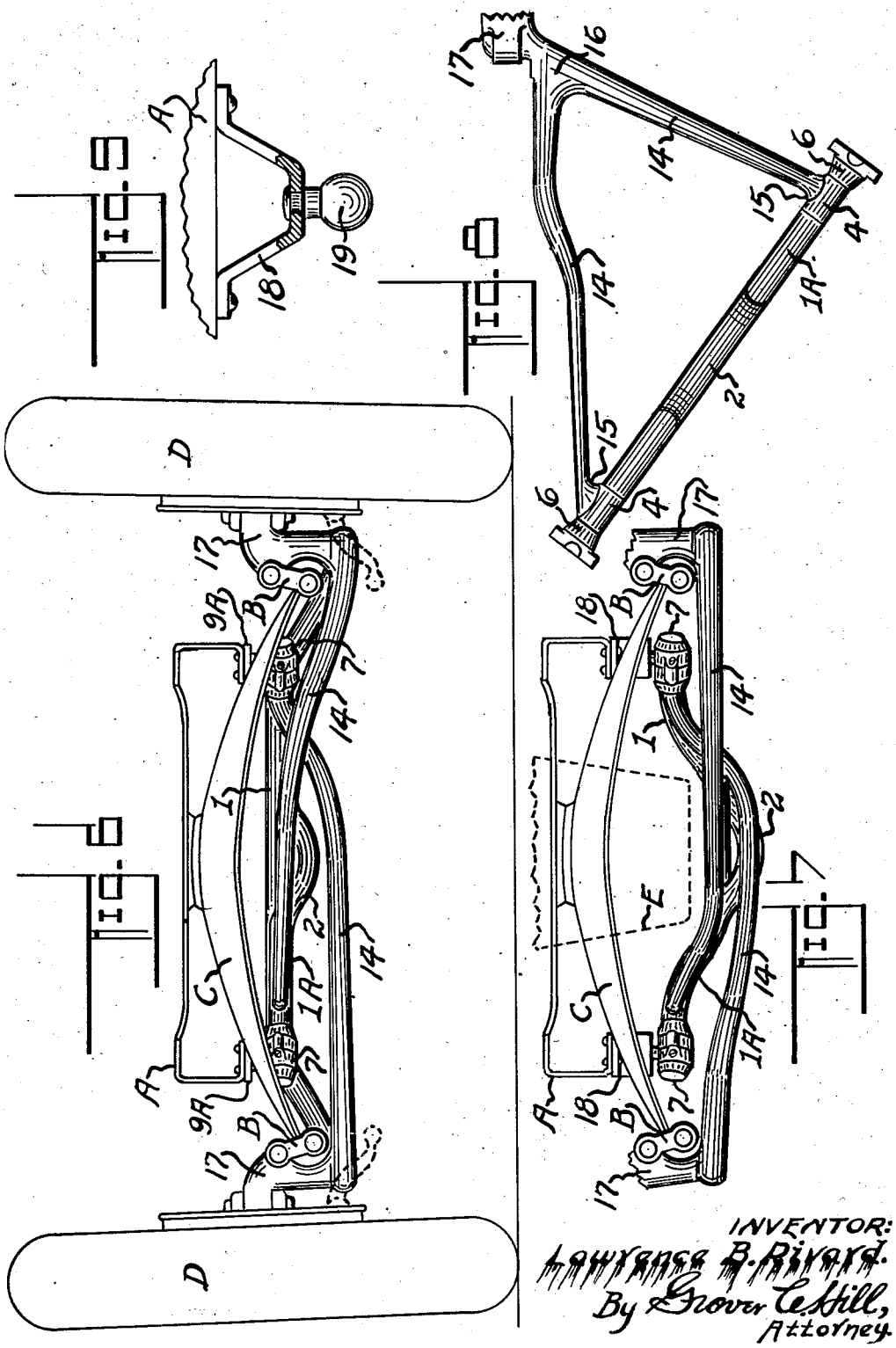

2,000,255

UNITED STATES PATENT OFFICE 2,000,255

INDEPENDENT VEHICLE WHEEL SUSPENSION

Lawrence B. Rivard, Dearborn, Mich.

Application February 7, 1934, Serial No. 710,041

6 Claims. (Cl. 267—19)

This invention has particular reference to independent spring action for vehicle wheels, or non-technically termed "knee action."

It is quite apparent at this stage that automotive engineers have made great strides in developing ingenious improvements for the riding qualities of the motor car. The outstanding feature of this activity resides in the so-called knee action.

While it is true that greater comfort in riding qualities has been successfully accomplished, in my opinion there are too many joints employed, and the system is otherwise highly complicated in comparison with the customary front axle unit. It is again apparent that the engineers, in so doing, have greatly enhanced the riding comfort of the motor car, but have apparently overlooked or sacrificed the stability and safety of the front end portion of the chassis. This is directed particularly to the fact that the front end of the chassis is not adequately reinforced as against distortion, which is increased more or less by lack of proper reinforcement and the extreme flexibility and spring action of the wheels.

My invention seeks to fully overcome these difficulties which is accomplished by the provision of a pair of opposed triangular frames that are adapted to be pivotally secured to the underneath portion of the front end of the chassis frame and having secured thereon as an integral part thereof a specially formed bracket upon each frame for accommodating the respective front wheels.

This arrangement produces a reinforcement for the front end of the chassis frame having a diagonal axis in relation thereto, with the use of the oscillatory joints where the frames are secured to the chassis frame, and the coordination of a leaf spring transversely mounted and in cooperation with the bracket portions of the frames, complete universal spring action of the front wheels is thereby attained, and simultaneously effecting transverse and longitudinal reinforcement and stability for this portion of the chassis frame.

These accomplishments are all acquired without sacrificing due strength or safety of the vehicle in the least, and with a minimum number of joints employed, the invention is effectively simplified over the present knee action systems.

The invention reveals further improvements, all of which will be apparent during the course of the following detailed description, illustrated throughout the accompanying drawings, and more specifically pointed out in the appended claims.

With reference to the drawings:

Figure 1 is a bottom plan assembly of the complete invention, and showing the same normally secured to the chassis; the dotted lines in this view indicate a suggested plan for arrangement of the steering apparatus, but not a part of the invention.

Figure 2 is an enlarged sectional view of one of the ball sockets.

Figure 3 is an elevation of the ball socket assembly.

Figure 4 is a fragmentary view showing the interior of the ball socket and cap therefor.

Figure 5 is an end elevation of the ball socket assembly.

Figure 6 is a front elevation assembly of the invention as it will appear connected directly to the chassis.

Figure 7 is a similar view to Figure 6, but showing the invention as it will appear somewhat lowered from the chassis by means of depending brackets.

Figure 8 is a view showing one of the diagonal frame members of the invention with the bracket portion thereof broken as indicated.

Figure 9 is an elevation of one of the brackets employed and with ball secured thereto.

The invention comprises a pair of triangular frames which may be of the tubular or solid type of construction, and with particular reference to Figure 1 it is understood that the frames are in the form of right and left members respectively for obvious reasons.

Said frames as it is observed, have diagonally extending bars 1 and 1A, and bar 1A having deflected portion 2 where indicated so as to avoid elevation of this portion of bar 1 in passing over bar 1A.

Referring to Figure 2 it is clearly seen that both ends of bars 1 and 1A form a reduced shank as at 3 and which are adopted to engage respective socket arms 4 and are permanently welded in this manner. Said arms having semi-socket portion 5 within enlargement 6 more clearly shown in Figure 4. Cap 7 is provided and has recessed portion 8 therein. Semi-socket 8 is adapted to conform to ball 9 and when said cap and portion 6 of arm 4 are assembled as in Figure 2 by means of screws 10 through lugs 7A and 6A, washer 11 is retained adjacent ball 9 by virtue of spring 12 within portion 13 of cap 7, so as to compensate for wear for the ball joint. It is further noted that ball 9 is made an integral part with base 9A and said base being secured to chassis frame A by the customary rivets as shown.

Again referring to Figure 1 it is seen that V-forming bars 14 are provided and having the ends thereof welded to diagonally extending bars 1 and 1A respectively as at 15. Bars 14 unite at the position 16 which is extended and forming thereby bracket portion 17, and said bracket portion being arranged so as to accommodate shackles B for the transversely arranged spring C. While not indicated in the drawings, bracket portion 17 also is arranged to accommodate the customary spindles for respective wheels D. The foregoing explanation pertains to the invention as arranged and secured to chassis frame A as disclosed in Figures 1 and 6.

When it is necessary to drop the invention to a point somewhat lower than chassis A so as to allow adequate clearance for motor E, brackets 18 are arranged for this purpose and the position of the invention will appear as in Figure 7. Brackets 18 are secured to chassis frame A by the customary rivets as clearly shown in Figure 9. Ball 19 is secured to said bracket where shown, and is similar to ball 9 of the first arrangement described. It is of course understood that four of brackets 18 are required which substitute base 9A of the former arrangement. Bars 1, 1A, and 14 are respectively deflected so as to accommodate the lowered position of the invention, as clearly seen in Figure 7.

The dotted lines in Figure 1 show substantially the customary arrangement of the present steering apparatus and clearly reveals that the use of the invention will not interfere with the same in any manner whatever; and it is further understood of course that the invention has no connection with the steering apparatus.

It is now understood from the foregoing explanation that by virtue of the triangular formation of the principal frame members of the invention diagonal bracing and likewise reinforcement is thereby attained for the front portion of chassis frame A, and inasmuch as said frames have oscillatory connection with chassis frame A, and are operative independent of each other, the universal flexibility of the wheels afforded by this arrangement, so called knee action or the full equivalent thereof is effected in a manner so as to support the wheels in a positive, flexible but rigid in construction and adequate to meet any road condition.

The device may be easily lubricated in the same manner as the customary chassis lubrication.

Due to the extreme simplification of the device both in design and in construction and with but few parts to wear it should successfully endure the full life of the vehicle.

An advantage of the device and one not to be overlooked, is the fact that it may be advantageously applied to the rear end of chassis frame A as well as to the front end thereof, and consequently may accommodate both ends with the desired effect. For the rear end application a compromise alteration in design of the rear axle unit may be readily accomplished.

Also it may be further added that while ball socket joints are indicated in the drawings for universal motion, joints of other types may be employed, which would still fall within the scope of the general principle involved.

Having thus described my invention, what I claim as new is:

1. In independently suspended vehicle wheels, a pair of oppositely disposed triangular frames, means for pivotally securing each frame to both sides of the bottom of a chassis frame, said frames formed so that they may be positioned in diagonal crossed relation and operatively independent of each other, and means for permanently fixing said frames with the vehicle wheels respectively.

2. In independently suspended vehicle wheels, means for forming a flexible reinforcement for the end of a chassis frame and vehicle wheels, comprising a pair of triangular frames secured to said frame in diagonal crossed relation, within the area of the triangular frames, said reinforcement being transversely, longitudinally, and diagonally in relation to the chassis frame.

3. In independently suspended vehicle wheels, means for a flexible transverse diagonal and longitudinal reinforcement for a chassis frame and vehicle wheels, comprising a pair of triangular frames secured to said frame in diagonal crossed relation within the area of the triangular frames.

4. In an independent vehicle wheel suspension, means operatively secured to the bottom of a chassis frame for controlling said wheel in a manner so as to effect a spring action therefor, and this action being supported by a rigid, transverse, diagonal and longitudinal reinforcement for said chassis frame comprising a pair of triangular frames secured to said frame in diagonal crossed relation within the area of the triangular frames.

5. In an independent vehicle wheel suspension, means operatively secured to a chassis frame and to the vehicle wheels at a position below said frame for a floating reinforcement, comprising a pair of triangular frames pivotally secured to said frame in diagonal crossed relation within the area of the triangular frames, thereby effecting lateral, diagonal, and longitudinal relation of aforesaid reinforcement with the chassis frame.

6. In an independent vehicle wheel suspension, a pair of triangular frames, each of said frames comprising an elongated bar and a V bar, said V bar being permanently secured to the first-named bar, the opposite end of said V bar forming a bracket thereon, said bracket for purpose of accommodating the spindle for supporting a vehicle wheel, a semi-socket arm secured to each end of aforesaid elongated bar, a ball adapted to be formed upon a base and said base secured to the bottom of a chassis frame, aforesaid semi-socket arms adapted to engage respective aforesaid balls in diagonal crossed relation with respect to the chassis frame, also a semi-socket cap for retaining each of the aforesaid ball joints.

LAWRENCE B. RIVARD.